United States Patent
Diab

(10) Patent No.: US 9,014,018 B2
(45) Date of Patent: Apr. 21, 2015

(54) AUTO-AWARE DYNAMIC CONTROL POLICY FOR ENERGY EFFICIENCY

(75) Inventor: Wael William Diab, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 470 days.

(21) Appl. No.: 12/915,103

(22) Filed: Oct. 29, 2010

(65) Prior Publication Data

US 2012/0106363 A1    May 3, 2012

(51) Int. Cl.
*H04L 12/12* (2006.01)
*H04L 12/26* (2006.01)
*H04L 12/24* (2006.01)

(52) U.S. Cl.
CPC ............ *H04L 12/12* (2013.01); *Y02B 60/43* (2013.01); *Y02B 60/34* (2013.01); *Y02B 60/32* (2013.01); *H04L 43/0882* (2013.01); *H04L 41/0833* (2013.01)

(58) Field of Classification Search
USPC ................................................ 370/229–253
See application file for complete search history.

(56) References Cited

U.S. PATENT DOCUMENTS

| | | | | |
|---|---|---|---|---|
| 8,327,026 | B1 * | 12/2012 | Tripathi et al. | 709/247 |
| 2007/0002792 | A1 * | 1/2007 | Twitchell, Jr. | 370/328 |
| 2008/0049630 | A1 * | 2/2008 | Kozisek et al. | 370/250 |
| 2008/0049638 | A1 * | 2/2008 | Ray et al. | 370/252 |
| 2008/0049639 | A1 * | 2/2008 | Wiley et al. | 370/252 |
| 2008/0232290 | A1 | 9/2008 | Elzur et al. | |
| 2010/0220687 | A1 * | 9/2010 | Reznik et al. | 370/331 |
| 2011/0317580 | A1 * | 12/2011 | Kozisek et al. | 370/252 |
| 2012/0026908 | A1 * | 2/2012 | Tzannes et al. | 370/252 |

FOREIGN PATENT DOCUMENTS

CN    101741721 A    6/2010

OTHER PUBLICATIONS

White Paper, Broadcom Energy Efficient Networking, Oct. 2010.
CN Office Action, Dec. 9, 2014.
Bashar et al., "Employing Bayesian Belief Networks for Energy Efficient Network Management," 2010.
CN Office Action, Dec. 18, 2013.
Anand et al., "Ethernet Adaptive Link Rate (ALR): Analysis of a MAC Handshake Protocol," IEEE, 2006.
CN Office Action, Jul. 7, 2014.
EP Communication, Dec. 10, 2013.
Anand et al., Ethernet Adaptive Link Rate (ALR): Analysis of a MAC Handshake Protocol, Nov. 1, 2006.

* cited by examiner

*Primary Examiner* — Thai Hoang
(74) *Attorney, Agent, or Firm* — Duane S. Kobayashi

(57) ABSTRACT

An auto-aware dynamic control policy for energy efficiency. A discovery node in a network can be designed to transmit periodically discovery traffic to a plurality of other network nodes in the network. Responses to the discovery traffic can be used by the discovery node to ascertain real-time activity in the network. Measures of the real-time activity can be used to adjust a control policy in the discovery node.

19 Claims, 4 Drawing Sheets

AUTO-AWARE DYNAMIC CONTROL POLICY FOR ENERGY EFFICIENCY

BACKGROUND

1. Field of the Invention

The present invention relates generally to energy efficiency and, more particularly, to an auto-aware dynamic control policy for energy efficiency.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, switches, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. Various solutions can seek to adapt the link, link rate, and layers above the link to an optimal solution based on various energy costs and impact on traffic, which itself is dependent on the application. Implementation of various solutions is based on a control policy. What is needed, however, is an auto-aware dynamic control policy for energy efficiency.

SUMMARY

An auto-aware dynamic control policy for energy efficiency, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy efficient Ethernet networks attempt to save power when the traffic utilization of the network is not at its maximum capacity. This serves to minimize the performance impact while maximizing power savings. At a broad level, the energy efficiency control policy for a particular link in the network determines when to enter a power saving state, what power saving state (i.e., level of power savings) to enter, how long to remain in that power saving state, what power saving state to transition to out of the previous power saving state, etc. In one example, an energy efficiency control policy can base these decisions on the properties of the traffic on the link itself.

Figure 1:
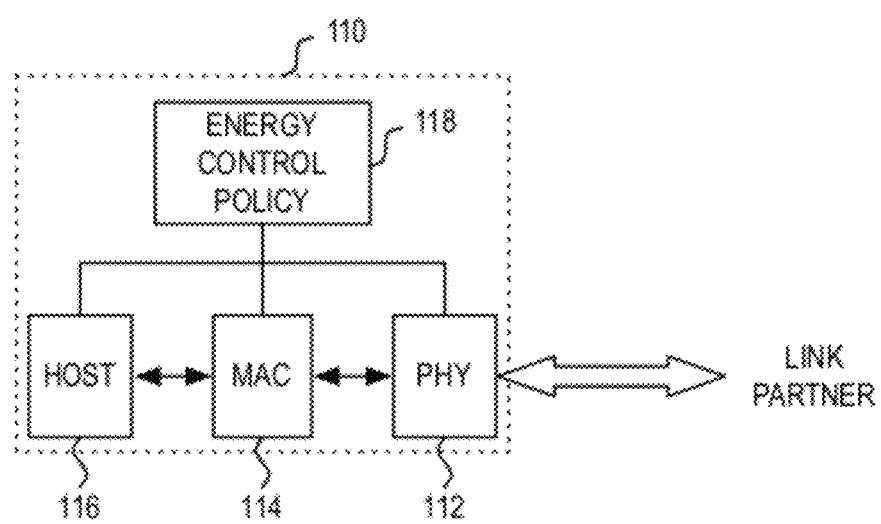
FIG. 1 illustrates an example of an energy efficiency control policy implemented in a network node.

FIG. 1 illustrates an example of a network node (e.g., switch) to which an energy efficiency control policy can be applied. As illustrated in FIG. 1, network node 110 includes physical layer device (PHY) 112, media access control (MAC) 114, and host 116. In general, host 116 can comprise suitable logic, circuitry, and/or code that may enable operability and/or functionality of the five highest functional layers for data packets that are to be transmitted over the link. Since each layer in the OSI model provides a service to the immediately higher interfacing layer, MAC controller 114 can provide the necessary services to host 116 to ensure that packets are suitably formatted and communicated to PHY 112. MAC controller 114 can comprise suitable logic, circuitry, and/or code that may enable handling of data link layer (Layer 2) operability and/or functionality. MAC controller 114 can be configured to implement Ethernet protocols, such as those based on the IEEE 802.3 standard, for example. PHY 112 can be configured to handle physical layer requirements, which include, but are not limited to, packetization, data transfer and serialization/deserialization (SERDES).

In general, controlling the data rate of the link may enable the network node and possibly its link partner to communicate in a more energy efficient manner. More specifically, a reduction in link rate to a sub-rate of the main rate enables a reduction in power, thereby leading to power savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate (e.g., turning off three of four channels). In another embodiment, the subset PHY technique can be enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10 G enhanced core can be transitioned down to a 1 G link rate when idle, and sped back up to a 10 G link rate when data is to be transmitted.

Another example of subrating is through the use of a low power idle (LPI) technique. In general, LPI relies on entering a quiet state where power savings can be achieved when there is nothing to transmit. Power is thereby saved when the link is off. Refresh signals can be sent periodically to enable wake up from the sleep mode.

In general, both the subset and LPI techniques involve turning off or otherwise modifying portions of the PHY during a period of low link utilization. As in the PHY, power savings in the higher layers (e.g., MAC) can also be achieved by using various forms of subrating as well.

As FIG. 1 illustrates, network node 110 also includes control policy entity 118. As noted above, control policy entity 118 can be designed to determine when to enter a power saving state, what power saving state (i.e., level of power savings) to enter, how long to remain in that power saving state, what power saving state to transition to out of the previous power saving state, etc. In one embodiment, control policy entity 118 in network node 110 includes software code that can interoperate with various layers, including portions of the PHY, MAC, or other subsystems in the host.

Conventionally, control policy entity 118 is enabled to analyze traffic on the physical link and to analyze operations and/or processing of data. For example, control policy entity 118 can be designed to analyze empty or non-empty conditions of ports, queues, buffers, etc. to determine whether to transition to or from a power saving state. In this example, the analysis of the conditions of ports, queues, buffers, etc. enables the control policy entity 118 to determine historical levels of link utilization. In one scenario, an indication of a low level of link utilization over a period of time can be used to trigger a change to a low-power operating state of one or more network node components (e.g., PHY, MAC, PHY/MAC interface, etc.) that support the particular network link.

In the present invention, it is recognized that the conventional analysis of looking at measures of past traffic levels on a network link is limiting in that those measures do not provide an indication of real-time network behavior or conditions. Moreover, the link-based measures are limiting in that they are focused on a link-specific context instead of a broader network context in which the link is operating. As such, the link-based measures fail to provide any indication of future changes to link utilization.

It is a feature of the present invention that a control policy of a network node can be designed to be responsive not only to historical measures of link utilization, but also to real-time measures of network activity in which the network node resides. A network node such as a switch is typically found in a network with a large number of switches and connections. Such networks can include access networks, enterprise networks, data centers, high performance computing (HPC) networks, storage area networks (SANs), etc. In one example, a computing environments such as a large enterprise network, can include very hundreds and even thousands of network switches designed to interconnect large numbers of computing devices.

Figure 2:
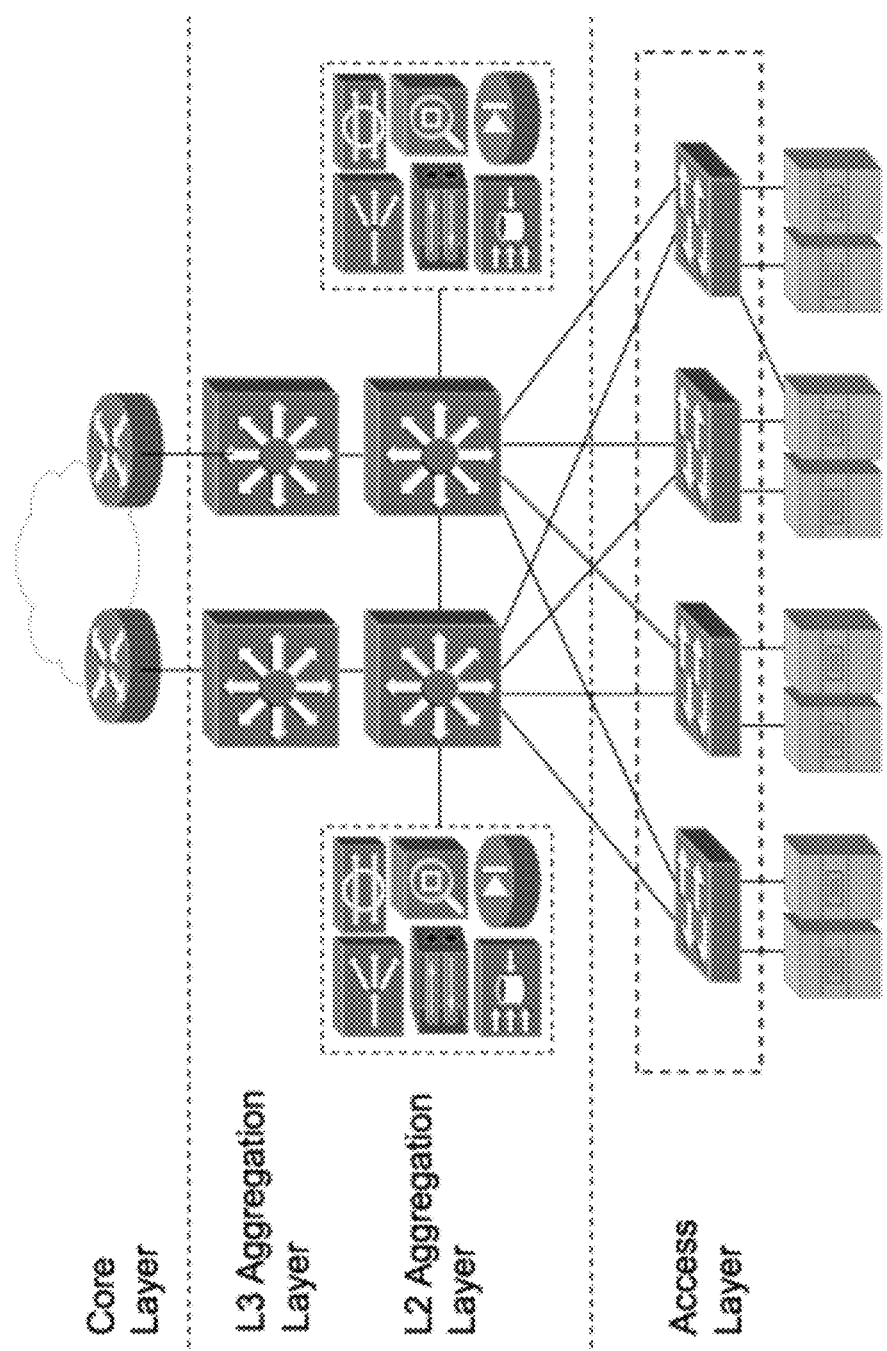
FIG. 2 illustrates an example of a network architecture.

FIG. 2 illustrates an example architecture of such networks in which a network node can be included. As illustrated, the network architecture can be organized into a core layer, an aggregation layer, and an access layer. In general, the core layer is responsible for fast and reliable transmission of data across a network. The core layer functions as the backbone network because all other layers rely upon it. As such, the core layer is designed for high data transmission rate, reduced latency, and high reliability. The aggregation layer plays a key role in aggregating traffic from large number of edge switches to be forwarded to the core switches as well as receiving traffic from core switches to distribute towards edge switches. In performing this aggregation function, the aggregation layer can include Layer 2/Layer 3 multilayer switches, firewalls, caches, load balancers, SSL offloaders, and intrusion detection systems. Finally, the access layer provides connectivity of servers to the aggregation layer via Layer 2 switches.

In the context of such a network architecture, an operational state of a particular network node (e.g., switch) can be influenced by much more than a simple historical analysis of traffic on a network link supported by the network node. For example, a switch in the core layer or the aggregation layer that looks only at the historical analysis of traffic on one of its network links would be unable to discern what is going on across the network. As would be appreciated, the activity in the network (e.g., loading at various servers in the access layer) can have a direct impact on the link utilization about to be seen at that switch. In the present invention, it is recognized that knowledge of such network activity can be used to anticipate future traffic levels, thereby providing an additional input by which a control policy can govern the operational state of a network node.

Figure 3:
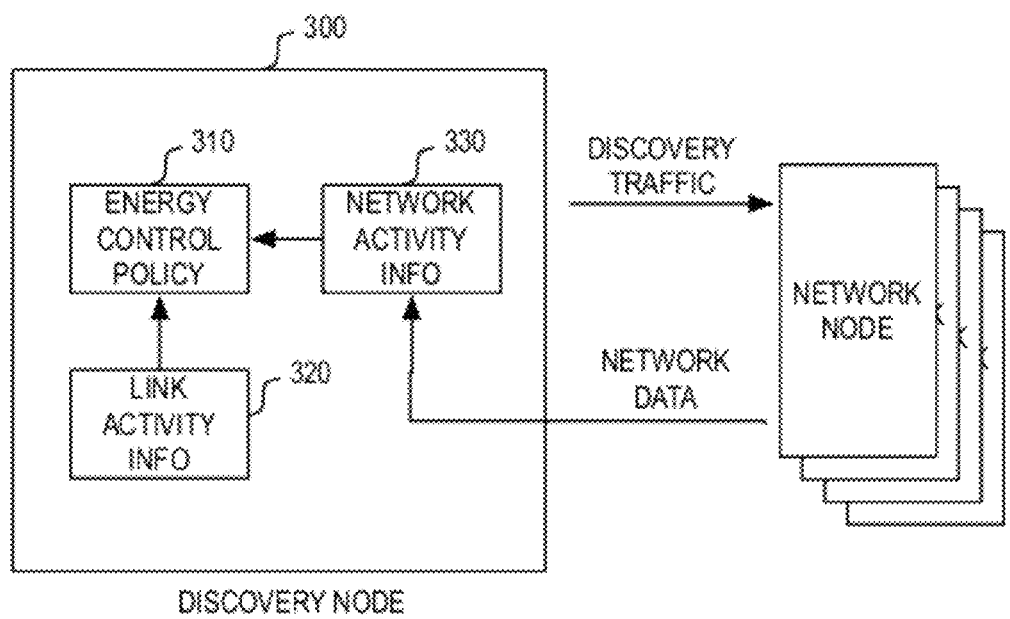
FIG. 3 illustrates an example of an energy efficiency control policy according to the present invention.

FIG. 3 illustrates an embodiment of a control policy implemented by a network node that can additionally consider measures of network activity. As illustrated, discovery node 300 includes an energy control policy 310. In general, any network node can function as a discovery node, whose function is described in detail below.

As described above, energy control policy 310 is designed to govern the energy efficiency of discovery node 300. As would be appreciated, the particular power saving states that are defined for discovery node 300 would be implementation dependant. In a simple example, a power saving state can be defined for a PHY that supports a network link. In the context of this example, energy control policy 310 can be designed to determine when the PHY is to enter a power saving state, what power saving state that the PHY is to enter (e.g., form of subrating implemented by the PHY), how long the PHY is to remain in that power saving state, what operational state the PHY is to transition to out of the power saving state, etc. As illustrated, energy control policy 310 can use link activity information 320 as one input to make energy control policy decisions. Link activity information can be based on the operation of a port, queue, buffer, etc., which provides some indication of traffic on a link.

Ultimately, link activity information provides a historical perspective of network activity and cannot be used to anticipate changes in link activity. For this reason, discovery node 300 is also designed to generate network activity information 330, which provides a second data input for energy control policy 310. In general, network activity information 330 is designed to provide energy control policy 310 with an indication of network activity that suggests a change in the future activity of discovery node 300. Network activity information 330 can be based on various network methods and is not confined to a particular form or discovery mechanism.

As illustrated in FIG. 3, network activity information 330 is based on network data received from a plurality of network nodes. In one embodiment, network data received from the plurality of network nodes is generated by the network nodes in response to discovery traffic generated by discovery node 300. In general, the discovery traffic generated by discovery node 300 is designed to poll or otherwise test the responsiveness or activity level of the plurality of network nodes. The responsiveness or activity level of the plurality of network nodes provides discovery node 300 with an indication of network activity that may or may not be reflected in the historical measures of link activity available to discovery node 300.

In a simple example, the discovery traffic can represent a "ping" of a network node (e.g., DNS server). This "ping" can represent a short data package that is sent to a particular network node to produce a response. By listening for the response, the discovery node can measure the roundtrip time of the package to determine a relative measure of network loading.

In another example, discovery node 300 can generate discovery traffic based on the Cisco Resource Reservation Protocol (RSVP). In general, RSVP is a network-control protocol that provides a means for reserving network resources to guarantee that applications transmitting end-to-end across networks achieve the desired quality of service (QoS). As such, RSVP enables discovery node 300 to determine latency across various hops in the network.

In further examples, discovery node 300 can test the responsiveness of the network by sending traffic intensive bursts (e.g., uploading/downloading test files). As would be appreciated, various types of discovery traffic can be sent to network nodes across the network to generate an aggregate picture of the real-time activity in the network. Such discovery traffic can be sent out on a periodic basis to identify any changes in network loading or performance.

Figure 4:
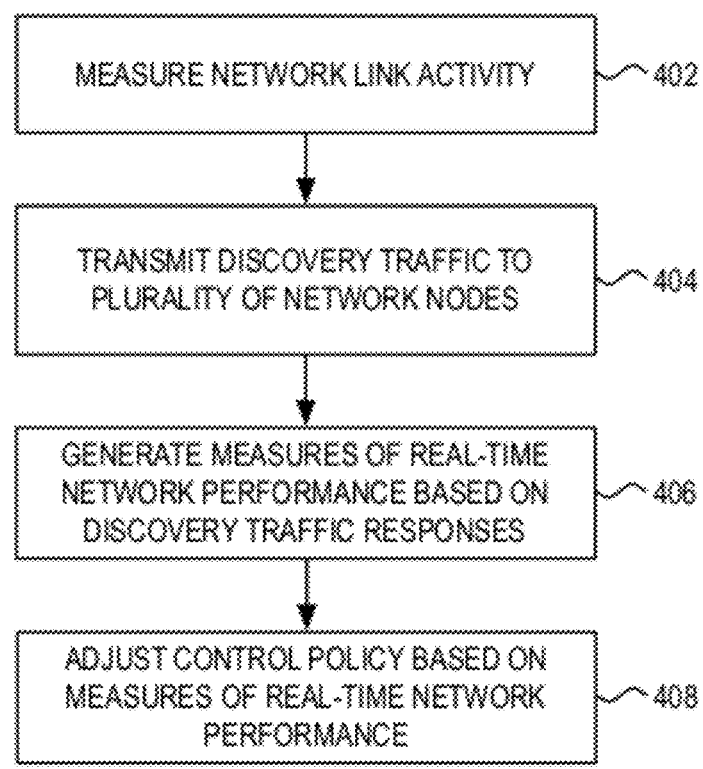
FIG. 4 illustrates a flowchart of a process of the present invention.

Having described a general framework of a dynamic control policy that is responsive to link activity information as well as network activity information, reference is now made to the flowchart of FIG. 4, which illustrates a process of the present invention. As illustrated, the process begins at step 402 where a discovery node measures network link activity. These measures of network link activity can be performed based on an analysis of a port, buffer, queue, etc. at the discovery node. In one embodiment, the measures of network activity can be performed in combination with information that is received from a peer device coupled to the discovery node via the network link.

Next, at step 404, the discovery node transmits discovery traffic to a plurality of network nodes. In one embodiment, the discovery traffic is transmitted periodically such that the discovery node is able to ascertain any changes in the network. As noted above, the specific form of the discovery traffic (e.g., ping, RSVP, data burst, etc.) would be implementation dependent. In one embodiment, the discovery traffic can be designed to enable measurement of a responsiveness of the network for particular types of traffic. For example, the discovery traffic can be designed to determine network responsiveness or activity relative to voice over IP (VOIP) traffic, video traffic, data traffic having a particular quality of service level, Ethernet audio/visual bridging (AVB) traffic, etc. As would be appreciated, measures relative to a particular type of traffic can be used to influence a control policy that is designed for that particular type of traffic. Traffic-specific measures can therefore produce greater granularity in the adjustments of one or more control policies implemented by the discovery node.

Next, at step 406, the discovery node would generate measures of real-time network performance based on responses by the plurality of network nodes to the discovery traffic. In various examples, the discovery node can generate measures of latency, responsiveness, upload/download speed, jitter, etc. based on the responses by the plurality of network nodes. Regardless of the particular type of response and/or measure produced based on such response, the generated measures are designed to provide the discovery node with a real-time view into the current state of the network. This real-time view is in contrast to link-based measures that can provide only a historical perspective of link traffic. In one embodiment, the real-time view afforded by the network activity information is used to anticipate changes (i.e., increase or decrease) in network loading that will be experienced by the discovery node.

These anticipated changes reflected by the network activity information are then used at step 408 to adjust the control policy. In one embodiment, the adjustment to the control policy can be reflected by a change in the level of aggressiveness (e.g., aggressive, neutral, conservative) of the control policy. For example, the level of aggressiveness can be used by the control policy to determine the relative length of timers that control operational state transitions. Here, an aggressive control policy can shorten a timer that determines when a low power state is entered, while a conservative control policy can lengthen a timer that determines when a low power state is entered. Similarly, an aggressive control policy can lengthen a timer that determines a duration of a sleep state, while a conservative control policy can shorten a timer that determines a duration of a sleep state. In general, the network activity information can be used to adjust any parameter of the control policy. For example, the adjustment to the control policy can relate to additional wake times or other operational parameters in a transmitter/receiver.

Additionally, the control policy adjusted by the network activity information can also be used to determine what power saving state to enter. In one implementation, the power savings states can relate to LPI or some other form of subrating. In another implementation, the power saving states can relate to subsystems beyond the PHY that are powered down. For example, the power saving states can relate to the MAC, the controller, memory on the switch, screen on a VOIP phone, etc. In another example, the power saving states can relate to services such as Ethernet AVB, Internet Small Computer System Interface (iSCSI), etc. that may or may not be run.

As has been described, the use of discovery traffic by a discovery node enables the discovery node to augment the considerations used by the control policy to now include real-time network activity information. This real-time network activity information enables the control policy to respond more accurately to network conditions (e.g., what to power down, how much to power down, etc.), thereby increasing energy efficiency of the discovery node.

In one embodiment, multiple network nodes having a control policy can be implemented as discovery nodes. To facilitate the discovery traffic for each discovery node, the multiple discovery nodes can scheduled in a round-robin scheme that prevents unnecessarily high levels of discovery traffic from loading the network.

In another embodiment, a particular discovery node can be designed to share network activity information generated in response to discovery traffic to be shared with other network nodes in the network. This provides an efficient mechanism by which a plurality of network nodes can benefit from real-time information that is generated by a single discovery node.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An energy efficiency method performed by a discovery node in a network, comprising:

controlling, via an energy efficiency control policy operating in said discovery node, transitions between an energy saving state and an active state of one or more components in said discovery node that support a network link, said energy efficiency control policy receiving as a first input a first measure of a level of utilization of said network link, wherein said energy saving state of said one or more components has a reduced power consumption and reduced data transmission rate as compared to said active state of said one or more components;

transmitting, from said discovery node, discovery traffic to each of a plurality of network nodes that are remote from said discovery node;

generating a second measure of current network performance for each of said plurality of network nodes based on a plurality of reply messages received from said plurality of network nodes in response to said transmitted discovery traffic; and adjusting an effect of said energy efficiency control policy on said one or more components in said discovery node based on a second input based on said second measure of current network performance for each of said plurality of network nodes.

2. The method of claim 1, further comprising measuring a condition of a port, queue, or buffer in said discovery node to generate said first measure.

3. The method of claim 1, wherein said controlling comprises placing at least part of a physical layer device in said discovery node in a low power state.

4. The method of claim 1, wherein said controlling comprises placing at least part of a media access control device in said discovery node in a low power state.

5. The method of claim 1, wherein said transmitting comprises transmitting a message that enables a determination of latency of a remote network node.

6. The method of claim 1, wherein said transmitting comprises transmitting a message that enables a determination of a responsiveness of a remote network node.

7. The method of claim 1, wherein said transmitting comprises transmitting a message that enables a determination of an upload or download speed of a remote network node.

8. The method of claim 1, wherein said transmitting comprises transmitting a message that enables a determination of jitter in latency of a remote network node.

9. The method of claim 1, wherein said transmitting comprises transmitting at periodic intervals.

10. The method of claim 1, further comprising transmitting said second measure of current network performance for each of said plurality of network nodes to one or more switch nodes separate from said discovery node.

11. The method of claim 1, wherein said adjusting comprises adjusting a level of aggressiveness of said energy efficiency control policy, wherein said adjustment includes an adjustment to a length of a timer that controls at least part of said transitions.

12. An energy efficiency method performed by a discovery node, comprising:

transmitting, from said discovery node, first discovery traffic to each of a first plurality of network nodes, said first discovery traffic designed to test a first level of current network performance of a first type of network traffic;

transmitting, from said discovery, node, second discovery traffic to each of a second plurality of network nodes, said second discovery traffic designed to test a second level of current network performance of a second type of network traffic different from said first type of network traffic;

generating a first measure of current network performance for each of said first plurality of network nodes based on first reply messages received from said first plurality of network nodes in response to said transmitted first discovery traffic;

generating a second measure of current network performance for each of said second plurality of network nodes based on second reply messages received from said second plurality of network nodes in response to said transmitted second discovery traffic; and adjusting an energy efficiency control policy in said discovery node based on said first and second measures of current network performance, said energy efficiency control policy controlling transitions between an energy saving state and an active state of one or more components in said discovery node, wherein said energy saving state of said one or more components has a reduced power consumption and reduced data transmission rate as compared to said active state of said one or more components, wherein said adjusting comprises adjusting a level of aggressiveness of said energy efficiency control policy through an adjustment of a length of a timer that controls at least part of said transitions.

13. The method of claim 12, wherein said transmitting comprises transmitting messages designed to measure network performance of transmission of voice over IP data.

14. The method of claim 12, wherein said transmitting comprises transmitting messages designed to measure network performance of transmission of video data.

15. The method of claim 12, wherein said transmitting comprises transmitting messages designed to measure network performance of transmission of data having a particular quality of service level.

16. The method of claim 12, wherein said energy efficiency control policy is also based on a measure of a level of utilization of a network link supported by said discovery node.

17. The method of claim 16, further comprising determining said level of utilization based a measure of a condition of a port, queue, or buffer in said discovery node.

18. An energy efficiency method performed by a discovery node in a network, comprising:

controlling, via an energy efficiency control policy operating in said discovery node, transitions between an energy saving state and an active state of a physical layer device in said discovery node that supports a network link, said energy efficiency control policy based at least in part on a level of utilization of said network link, wherein said energy saving state of said physical layer device has a reduced power consumption and reduced data transmission rate as compared to said active state of said physical layer device; and adjusting a level of aggressiveness of said energy efficiency control policy based on measures of current network performance of a plurality of network nodes that are remote from said discovery node, said measures of current network performance based on reply messages generated by said plurality of network nodes in response to discovery messages designed to test a responsiveness of said plurality of network nodes, wherein said adjustment of said level of aggressiveness includes an adjustment to a length of a timer that controls at least part of said transitions.

19. The method of claim 18, further comprising receiving said measures of network performance from a discovery node.

* * * * *